United States Patent [19]
Tanaka et al.

[11] Patent Number: 5,945,212
[45] Date of Patent: *Aug. 31, 1999

[54] INSULATING FILM TREATING AGENT HAVING EXTREMELY EXCELLENT FILM CHARACTERISTICS AND PRODUCTION METHOD FOR NON-ORIENTED ELECTRICAL STEEL SHEET USING THE TREATING AGENT

[75] Inventors: Osamu Tanaka, Kitakyusyu; Kikuji Hirose; Kazutoshi Takeda, both of Himeji; Seiichiro Chou; Masahiro Yamamoto, both of Kitakyusyu, all of Japan

[73] Assignee: Nippon Steel Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/782,856

[22] Filed: Jan. 13, 1997

Related U.S. Application Data

[63] Continuation of application No. 08/225,207, Apr. 8, 1994, abandoned.

[30] Foreign Application Priority Data

| May 21, 1993 | [JP] | Japan | .................................... 5-120267 |
| Jul. 26, 1993 | [JP] | Japan | .................................... 5-184205 |

[51] Int. Cl.$^6$ ...................................................... B32B 5/16
[52] U.S. Cl. .......................... 428/327; 428/328; 428/338; 428/339; 428/375; 428/457; 428/500; 428/521; 427/385.5; 427/388.1; 427/398.1
[58] Field of Search ..................................... 524/405, 415, 524/436, 437; 428/327, 328, 338, 339, 500, 521, 457, 375, 141; 427/385.5, 388.1, 398.1

[56] References Cited

U.S. PATENT DOCUMENTS

| 4,288,492 | 9/1981 | Hiromae et al. .......................... 428/336 |
| 4,363,677 | 12/1982 | Ichiyama et al. ........................ 198/111 |
| 4,554,213 | 11/1985 | Marini et al. ............................ 428/418 |
| 4,618,377 | 10/1986 | Nakamura et al. ................. 148/6.15 R |

FOREIGN PATENT DOCUMENTS

| 0 191 219 | 2/1986 | European Pat. Off. . |
| 2557584 | 5/1905 | France . |
| 2302578 | 2/1976 | France . |
| 50-15013 | 6/1975 | Japan . |
| 578855 | 3/1993 | Japan . |
| 6101057 | 4/1994 | Japan . |
| 6101058 | 4/1994 | Japan . |

OTHER PUBLICATIONS

European Search Report 94 10 6138.

*Primary Examiner*—Stevan A. Resan
*Attorney, Agent, or Firm*—Kenyon & Kenyon

[57] ABSTRACT

A film treating agent for a non-oriented electrical steel sheet having excellent film characteristics such as high space factor, punchability, weldability, and adhesion, and having excellent lubricating properties after stress relief annealing agent comprises, as principal components thereof, 100 parts by weight, calculated in terms of the solid, of at least one member selected from the group consisting of aluminum phosphate, calcium phosphate and zinc phosphate, as an inorganic material, and 1 to 300 parts by weight of a coarse grain emulsion resin having a grain size of 0.3 to 3.0 $\mu$m, as an organic material.

8 Claims, 3 Drawing Sheets

INSULATING FILM TREATING AGENT HAVING EXTREMELY EXCELLENT FILM CHARACTERISTICS AND PRODUCTION METHOD FOR NON-ORIENTED ELECTRICAL STEEL SHEET USING THE TREATING AGENT

This application is a continuation of application Ser. No. 08/225,207 filed Apr. 8, 1994 now abandoned.

BACKGROUND OF THE INVENTION

1. Field of the Invention

This invention relates to an electrical insulating film treating agent for an electrical steel sheet having a high space factor, excellent weldability and punchability before annealing, and further having sticking resistance at the time of annealing and excellent corrosion resistance, lubricating property, adhesion, etc., after annealing, and to an insulating film treating method using the treating agent.

2. Description of the Related Art

When a non-oriented electrical steel sheet is used for an iron core of a motor or a transformer, the sheet is first punched out into a predetermined shape and is then subjected to stress relief annealing. Next, a predetermined number of such steel sheets are stacked and then bonded by welding, caulking, bonding, etc., to form a stacked core, as is well known in the art.

Generally, an electrical insulating film is formed on the surface of the non-oriented electrical steel sheet. In order to obtain excellent core characteristics and machinability, it is very important for this insulating film to have high sticking resistance at the time of annealing and excellent corrosion resistance and lubricating property after annealing, in addition to the required characteristics such as corrosion resistance, weldability, adhesion, high space factor, etc., besides the insulating property.

Inorganic type, organic type and inorganic-organic type insulating films are known in the past as the electrical insulating film for the non-oriented electrical steel sheet. In comparison with the organic type and organic-inorganic mixture type films, the inorganic type insulating film has higher heat resistance and superior lubricating property after stress relief annealing, but its punchability is inferior. On the other hand, the organic type insulating film has excellent punchability and adhesion, but the film is likely to be partially decomposed and burn out by stress relief annealing. In other words, since adhesion after stress relief is very low, the film cannot withstand practical use. The inorganic-organic type film agent has been developed in order to solve the drawbacks in the film comprising the inorganic components alone and the film comprising the organic components alone, and has been used most generally at present. As an example of the inorganic-organic mixture type insulating film, Japanese Examined Patent Publication (Kokoku) No. 50-15013 proposes an insulating film formation method having excellent film characteristics such as a high space factor, high adhesion, punchability, etc., and capable of maintaining excellent film characteristics even after stress relief annealing, by using a treating solution comprising a dichromate and an organic resin emulsion of vinyl acetate, butadiene-styrene copolymer, acrylic resin, etc., as the principal components. Japanese Unexamined Patent Publication (Kokai) No. 5-78855 proposes an insulating film agent for an electromagnetic steel sheet comprising an aqueous solution prepared by mixing an inorganic type aqueous solution containing 100 to 350 g/l of aluminum dihydrogenphosphate, calculated in terms of $P_2O_5$, and a synthetic resin emulsion having a pH of 1 to 3, in such a manner that volatile components of the latter accounts for 10 to 40 wt % on the basis of the total amount of volatile components of both of them, as an insulating film agent which is different from the component system of the prior art reference described above and which does not contain the chromate. Furthermore, this reference proposes an insulating film formation composition for an electrical steel sheet prepared by mixing an inorganic type aqueous solution containing 100 to 350 g/l of aluminum dihydrogenphosphate, calculated as $P_2O_5$, and a synthetic resin emulsion having a pH of 1 to 3, in such a manner that volatile components of the latter accounts for 10 to 50 wt % on the basis of the total amount of volatile component of both of them, and adding 5 to 20 parts by weight, on the basis of 100 parts by weight of the total volatile components of the mixed aqueous solution, of cross-linkable resin granular powder having a mean grain size of 5 to 15 $\mu$m. The reference invention describes that the resin emulsion having a pH of 1 to 3 is used so as to improve stability in an acidic mixed solution, and the coarse grain powdery resin is used so as to form concavo-convexities on the film surface and to improve weldability by improving air permeability at the time of welding.

For the film characteristics of the non-oriented electrical steel sheet having the electrical insulating film having excellent film characteristics, which is disclosed in Japanese Examined Patent Publication (Kokoku) No. 50-15013 described above, punchability before annealing is good but a drop in the insulating property due to some residual film matter is observed after annealing, and as to the film characteristics after stress relief annealing, heat resistance, corrosion resistance, lubricating property, etc., are not sufficient and further improvements must yet be achieved.

The drawbacks with the technology of Japanese Unexamined Patent Publication (Kokai) No. 5-78855 are as follows. When the coarse grain powdery resin is added to the mixed solution of the inorganic component and the emulsion resin, aggregation of the powdery resin is unavoidable, dispersion of uniform particles is difficult, and a drop in the space factor occurs because the grain size of the coarse grain resin powder is great. Another critical problem is that peel and fall-off of carbides are likely to occur after annealing due to the carbonization reaction of the coarse grain resin aggregates. The non-uniform surface condition, which is brought forth by the aggregation of the coarse grain resin, invites unstability of lubricating property, corrosion resistance, insulating property, and so forth. Accordingly, the technology described in this prior art reference cannot yet be said entirely satisfactory.

As described above, when the non-oriented electrical steel sheet is used for the iron core of the motor or the like, the steel sheet is first punched out into the predetermined shape and stress relief annealing is then carried out. Thereafter, a predetermined number of the steel sheets thus punched out are stacked and bonded by welding, caulking, bonding, etc., to obtain the stacked iron core. Because automation has made a remarkable progress in such a production process in recent years, the steel sheets after stress relief annealing must have good lubricating property on a guide during the stacking process and must also have good mutual lubricating property and caulkability.

If the steel sheet has low lubricating property, it does not smoothly move on the guide during the production process and flaws are likely to occur on the surface or peeling of the film occurs. On the other hand, when the sections of a predetermined number of punched sheets are aligned by an automatic correction machine at the time of stacking of the core, the sections of the punched sheets are damaged or buckling occurs. Because the heat resistance is not sufficient, deterioration of the core characteristics becomes a problem due to the occurrence of rust during the use of the annealed material.

SUMMARY OF THE INVENTION

The present invention is directed to provide a treating method which solves the problems with the electrical insulating film having excellent film characteristics described in Japanese Examined Patent Publication (Kokoku) No. 50-15013 and Japanese Unexamined Patent Publication (Kokai) No. 5-78855 described above by using a treating solution not containing a chromium compound and by improving the inorganic components as well as the organic components, and which imparts a high space factor, weldability and punchability, and excellent lubricating property, corrosion resistance, insulating property, adhesion and appearance to the film after stress relief annealing.

The gist of the present invention resides in the following constructions.

(1) A treating solution for a non-oriented electrical steel sheet having extremely excellent film characteristics, comprising, as principal components thereof, 100 parts by weight, calculated in terms of a solid, of at least one member selected from the group consisting of aluminum phosphate, calcium phosphate and zinc phosphate as an inorganic material, and 1 to 300 parts by weight of a coarse grain emulsion resin having a grain size of 0.3 to 3.0 μm as an organic material.

(2) A treating solution for a non-oriented electrical steel sheet having extremely excellent film characteristics, comprising, as principal components thereof, 100 parts by weight, calculated in terms of a solid, of at least one member selected from the group consisting of aluminum phosphate, calcium phosphate and zinc phosphate and containing at least 50% of aluminum phosphate, as an inorganic material, 1 to 20 parts by weight of at least one member selected from the group consisting of phosphoric acid, boric acid, borates and colloidal silica, and 1 to 300 parts by weight of a coarse grain emulsion resin having a grain size of 0.3 to 3.0 μm as an organic component.

(3) A method for producing a non-oriented electrical steel sheet having extremely excellent film characteristics characterized in that a treating solution comprising, as principal components thereof, 1 to 300 parts by weight of a coarse grain emulsion resin having a grain size of 0.3 to 3.0 μm, as an organic component, and 100 parts by weight, calculated in terms of a solid, of at least one member selected from the group consisting of aluminum phosphate, calcium phosphate and zinc phosphate as an inorganic component is uniformly coated on a surface of an electromagnetic steel sheet, and is then baked at 200 to 500° C.

(4) A method of producing a non-oriented electrical steel sheet having extremely excellent film characteristics characterized in that a treating solution comprising, as principal components thereof, 1 to 300 parts by weight of a coarse grain emulsion having a grain size of 0.3 to 3.0 μm, as an organic component, and 100 parts by weight, calculated in terms of a solid, of at least one member selected from the group consisting of aluminum phosphate, calcium phosphate and zinc phosphate, and 1 to 20 parts by weight of at least one member selected from the group consisting of phosphoric acid, boric acid, borates and colloidal silica, as an inorganic component, is uniformly coated on a surface of an electromagnetic steel sheet, and is then baked at 200 to 500° C.

(5) A non-oriented electrical steel sheet having extremely excellent film characteristics characterized in that a film forming agent comprising at least one member selected from the group consisting of aluminum phosphate, calcium phosphate and zinc phosphate as the inorganic component according to the first item described above and an organic component, is coated on a surface of an electrical steel sheet, and surface coarseness before stress relief annealing is 0.15 to 0.70 μm in terms of an Ra value.

(6) A non-oriented electrical steel sheet having extremely excellent film characteristics characterized in that a film forming agent comprising at least one member selected from the group consisting of aluminum phosphate, calcium phosphate and zinc phosphate as the inorganic component according to the second item described above, and at least one member selected from the group consisting of phosphoric acid, boric acid, borates and colloidal silica, and an organic component, is coated on a surface of an electromagnetic steel sheet, and surface coarseness before stress relief annealing is 0.15 to 0.70 μm in terms of an Ra value.

(7) A surface treating agent for a non-oriented electrical steel sheet having extremely excellent film characteristics and a production method thereof according to any of the third to sixth items described above, wherein when the phosphate used as the inorganic component is aluminum phosphate the molar ratio of $Al_2O_3/H_3PO_4$ is from 0.15 to 0.20, and when the phosphate is calcium phosphate and zinc phosphate, the molar ratios $CaO/H_3PO_4$ and $ZnO/H_3PO_4$ are from 0.40 to 0.60.

(8) A surface treating agent of a non-oriented electrical steel sheet having extremely excellent film characteristics and a production method of the non-oriented electrical steel sheet using the surface treating agent, according to any of the third to seventh items described above, wherein the pH of the coarse grain emulsion used as the organic component is from 4 to 10.

(9) A surface treating agent of a non-oriented electrical steel sheet having extremely excellent film characteristics and a production method for the non-oriented electrical steel sheet using the surface treating agent, according to any of the third to eighth items described above, wherein a degree of cross-linkage of the coarse grain resin emulsion used as the organic component is from 0.4 to 8 mol % with respect to a cross-linkable monomer or a monomer mixture.

(10) A non-oriented electrical steel sheet having extremely excellent film characteristics, a treating agent for the non-oriented electrical steel sheet, and a production method for the non-oriented electrical steel sheet, according to any of the first to ninth items described above, wherein a resin component used as the organic component is at least one member selected from the group consisting of acryl, polystyrene, vinyl acetate, silicone, polyethylene, polypropylene, polyamide, polycarbonate, melamine, phenol, polyurethane, alkyd, isocyanate and epoxy.

BRIEF DESCRIPTION OF THE DRAWINGS

FIGS. 2(a) and 2(b) are views showing a measuring method of sticking resistance in stress relief annealing, wherein FIG. 2(a) is a perspective view of a stacked steel sheet as-annealed after baking, and FIG. 2(b) shows a method for measuring a separating force of a steel sheet by a spring scale.

FIGS. 3(a) and 3(b) are photographs of a sheet surface before and after annealing by a treating agent of Sample No. 1 in Example 5 according to the present invention, wherein FIG. 3(a) shows the surface before annealing and FIG. 3(b) does the surface after annealing.

DESCRIPTION OF THE PREFERRED EMBODIMENTS

Figure 1:
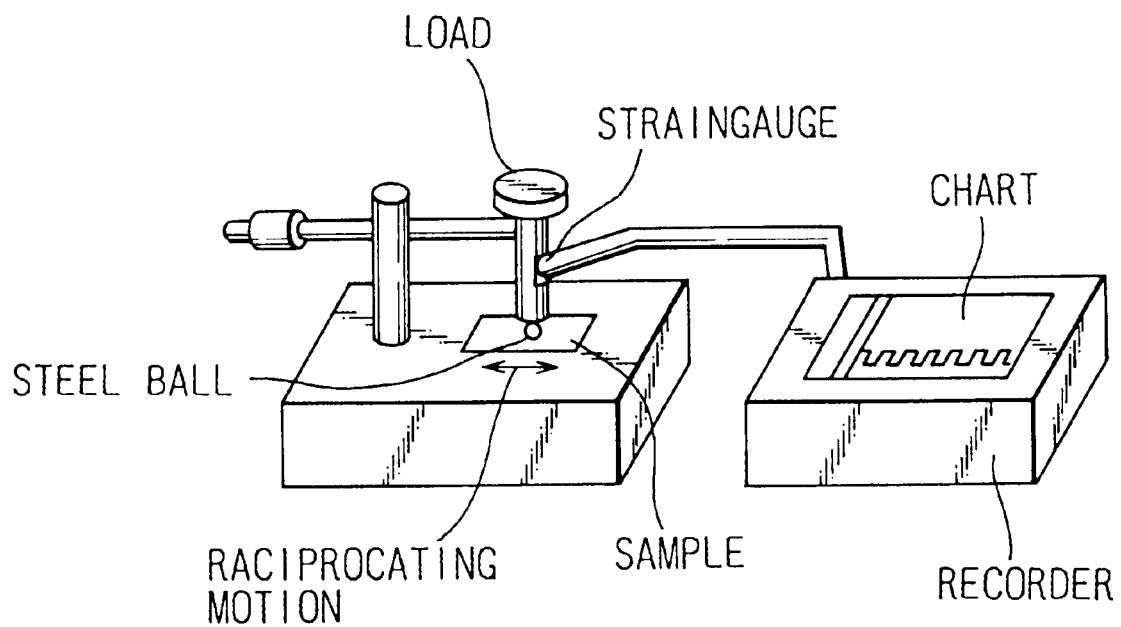
FIG. 1 is a schematic view of a measuring equipment for flaw resistivity of a steel sheet before and after stress relief annealing according to the present invention.

The inventors of the present invention have found that when the chromate-emulsion resin system treating solution according to the prior art described above is used, degradation of the film properties occurs during stress relief annealing due to decomposition of the film components. Consequently, lubricity, corrosion resistance, insulating properties, etc., after annealing, drop. The present inventors have furthered their studies so as to solve the problems of the space factor and uniformity of the film, particularly the film properties after annealing, in the improved technology described in the afore-mentioned Japanese Unexamined Patent Publication (Kokai) No. 5-78855.

As a result of intensive studies on the emulsion resins and the film structures, the present inventors have found that excellent film performance can be obtained by using phosphates of Al, Ca and Zn systems principally comprising aluminum phosphate in place of chromium compounds used in the prior art, and by using a film agent of an inorganic-organic system basically comprising an emulsion of 0.3 to 3.0 μm in grain size. Further, the inventors have found that the drawbacks with the prior art described above can be solved altogether by using a particular emulsion resin having high stability, which comprises a coarse grain emulsion resin having a pH of 4 to 10 in the form of an aqueous solution of 0.3 to 3.0 μm in grain size, wherein the degree of cross-linkage is 0.4 to 8 mol % on the basis of the monomer mixture. In this way, the space ratio and slidability, corrosion resistance, insulating property, adhesion and surface coating characteristics after annealing can be drastically improved. The present invention has thus been completed.

Hereinafter, the inorganic compounds used in the present invention will be explained in detail.

Aluminum phosphate, calcium phosphate and zinc phosphate play an important role as a film formation agent having high heat resistance, which stably forms a film by baking at a low temperature. Further, since they have important functions as the binder in the mixture with other inorganic and organic compounds, they are used as the principal component in the present invention.

The term "aluminum phosphate" used in the present invention means the reactants of the aluminum compounds such as Al (OH)$_3$, Al$_2$O$_3$, etc., with phosphoric acid (H$_3$PO$_4$) and they are usually analogous to an aqueous Al (H$_2$PO$_4$)$_3$ solution, which is referred to as "aluminum primary phosphate". The composition changes with a molar ratio. In this instance, the molar ratio of Al$_2$O$_3$/H$_3$PO$_4$ in the solution is within the range of 0.15 to 0.20. When the molar ratio is less than 0.15, the amount of free phosphoric acid becomes great. In consequence, hygroscopicity, and sticking in stress relief annealing, undesirably increase. If the molar ratio is greater than 0.20, on the other hand, stability of the aluminum phosphate itself deteriorates, so that precipitation of Al$_2$O$_3$ and Al (H$_2$PO$_4$)$_3$ occurs in the solution, and non-uniformity of the color tone occurs and deteriorates the appearance of the film. Calcium phosphate and zinc phosphate are similarly produced by the reaction of the respective oxides or hydroxides with phosphoric acid. The molar ratio of the calcium phosphate and zinc phosphate is limited to the range of 0.40 to 0.60 for the same reason as in the case of aluminum phosphate. Calcium phosphate and zinc phosphate have high film formability at a low temperature in the same way as the aluminum phosphate does, and can be used as components of the present invention. Though they improve lubricity and appearance, their heat resistance is somewhat lower than that of aluminum phosphate. Accordingly, their amount is preferably up to 30% of the total phosphate.

In the present invention, boric acid, borates, phosphoric acid, etc., can be added, whenever necessary. Each of them provides the effect of enhancement of film formation at a low temperature, and the increase of the film heat resistance in stress relief annealing, besides the increment of compactness and surface gloss of the vitrified film.

Next, the emulsion resin used in the present invention will be explained.

One of the characterizing features of the present invention resides in the use of a coarse grain resin emulsion of 0.3 to 3.0 μm in grain size. At least one of the resins selected from the group consisting of acrylic, polystyrene, polypropylene, polyamide, polycarbonate, melamine, phenol, polyurethane, alkyd, isocyanate, epoxy and the like resins, can be used as the emulsion resin. These resins can be stabilized as the coarse grain emulsion, by the growth reaction and the emulsification system of specific grains.

The first technical feature of a resin emulsion in this case is the use of a coarse grain of 0.3 to 3.0 μm in grain size. More specifically, the present inventors have paid specific attention to the use of novel coarse emulsion type resins which have not been obtained previously by resin production technology according to the prior art, and have developed a new production technology. This new technology can make a remarkable improvement of the film property. When the grain size is less than 0.3 μm, a fine protruded shape having a spherical surface, which can be formed with the mixture of organic compounds comprising phosphates, etc., cannot be obtained. Accordingly, the improvement effects of film performance such as weldability, insulating property, lubricating property, heat resistance, and so forth, before and after annealing cannot be obtained. When the grain size of the emulsion resin is greater than 3.0 μm, on the other hand, dispersion stability of the grains in the solution becomes low, and the drop of the space factor as one of the film characteristics after the formation of the film is induced. The production cost of the resin becomes high, and there is the problem of liquid separation due to precipitation of the resin during storage. Therefore, the emulsion resin becomes more difficult to use on the industrial basis, and the use is limited.

The degree of cross-linkage is the second technical feature of the coarse grain emulsion resin according to the present invention. The amount of the cross-linkable monomer is 0.4 to 8.0 mol % on the basis of the monomer mixture as the degree of cross-linkage, and the pH value of the resin emulsion is 4 to 10. In this way, film performance and the operation stability in the film formation process can be remarkably improved. The pH value is in the range of 4 to 10. If it is less than 4, mechanical stability of the resin grain drops and the grain cannot withstand friction, or the like, during the production process. On the other hand, if the pH value is more than 10, a problem occurs in that the resin swells due to the alkali components and invites the increase of the viscosity. Another problem is the occurrence of gelling. Therefore, the use of the resin is limited. In conjunction with the degree of cross-linkage of the resin, the amount of the cross-linkable monomer is 0.4 to 8.0 mol % on the basis of the monomer mixture. This requirement is important when the film is formed at a low temperature by using the coarse grain emulsion resin as is in the present invention and by the reaction of the inorganic component such as the phosphate, because the degree of cross-linkage affects the appearance of the film and its heat resistance. When the amount of the monomer is smaller than 0.4 mol % on the basis of the monomer mixture, the film undesirably becomes opaque, so that non-uniformity of the color tone occurs, during film baking. Since the density of the cross-linkage of the grains is low, the resulting film does not have sufficient strength, and is inferior in solvent resistance, blocking resistance, lubrication property, and so forth. On the other hand, if the amount is greater than 8.0 mol %, aggregates are likely to be formed and polymerization itself does not smoothly proceed. Furthermore, the heat resistance as one of the film characteristics, particularly of the film characteristics after annealing, undesirably drops.

The present inventors have repeated large studies and experiments on the production of the resins and the stabilization conditions, and have found that when the emulsion resin grain size, the pH value and the degree of cross-linkage described above are satisfied, a stable coarse grain resin can be obtained, stable dispersion characteristics can be obtained even in the mixed solution, and a film having luster and uniform color tone can be formed at the time of baking.

Next, the additive components used in the present invention and their blend ratios will be explained.

In the present invention, at least one member selected from the group consisting of phosphoric acid, boric acid, borates and colloidal silica is added as the additive, whenever necessary, to the base components of the phosphate and the emulsion resin.

The amount of addition of the water-dispersible coarse grain emulsion resin is limited to 1 to 300 parts by weight to 100 parts by weight of at least one of aluminum phosphate, calcium phosphate and zinc phosphate. For, if it is less than 1 part by weight, sufficient punchability and compactness and luster of the film cannot be obtained. If it is greater than 300 parts by weight, on the other hand, peel of the film occurs at the time of stress relief annealing and sufficient heat resistance cannot be obtained. Further, the lubricating property, the corrosion resistance and the adhesion of the film after annealing deteriorate.

The amount of phosphoric acid, boric acid and borates that are added as the inorganic component, whenever necessary, is 1 to 20 parts by weight on the basis of 100 parts by weight of the phosphates. If the amount is less than 1 part by weight, sufficient compactness of the film and improvements in its appearance and heat resistance cannot be obtained. If the amount exceeds 20 parts by weight in the case of boric acid and borates, the problem of stability in the solution occurs due to their solubility, and precipitation is likely to occur. Further, the improvements in heat resistance, insulating property, surface appearance of the film, etc., are also limited.

The additives function to improve film characteristics such as appearance, adhesion, heat resistance, corrosion resistance, etc., of the film, and particularly, the sticking prevention effect is great during stress relief annealing.

Next, the baking treatment method in the present invention and the coating amount will be explained.

The treating solution is coated and baked by the steps of diluting the treating solution with water to a suitable concentration, coating a predetermined amount of the solution using a roll coater, and carrying out baking treatment for a short time at a baking temperature of 200 to 500° C. When the baking temperature is lower than 200° C., the reaction does not sufficiently proceed between the phosphates and the resin component, so that the film becomes sticky due to hygroscopicity of the film after baking or rust occurs, and sticking becomes more likely to occur during stress relief annealing. If the baking temperature is higher than 500° C., on the other hand, even a resin having a high heat resistance such as the present invention is partially decomposed or carbonized, so that machinability, such as punchability, undesirably deteriorates.

The quantity of the insulating film to be formed on the surface of the electrical steel sheet is not particularly limited, but is suitably within the range of 0.5 to 3.0 g/m$^2$. If it is less than 0.5 g/m$^2$, sufficient punchability cannot be obtained, and excellent results cannot be obtained, either, in insulating property, lubricating property, corrosion resistance, and so forth. If its exceeds 3.0 g/m$^2$, on the other hand, the film is likely to peel during stress relief annealing, the space factor drops, and the color tone of the appearance of the film is deteriorated.

As already described, the resin emulsion used in the present invention is a specific resin emulsion produced under the condition where the grain size is 0.3 to 3.0 $\mu$m, the amount of the cross-linkable monomer is preferably within the range of 0.4 to 8 mol % with respect to the monomer mixture and furthermore, the pH value is within the range of 4 to 10. The amount of addition of this resin emulsion is limited to 1 to 300 parts by weight on the basis of 100 parts by weight of the phosphate. Further, 1 to 20 parts by weight of phosphoric acid, boric acid, borates and colloidal silica are added as the additives, whenever necessary. Under this condition, it is possible to obtain an electrical insulating film having high space factor, weldability, punchability, adhesion and heat resistance, and also high corrosion resistance, lubricating property, adhesion, insulating property, etc., as the characteristics after annealing.

The present invention uses the phosphates of aluminum, zinc and calcium and, if necessary, phosphoric acid, boric acid and borates, as the inorganic components. Accordingly, the present invention can form a compact insulating film having high adhesion and high heat resistance using a low temperature baking. Furthermore, the present invention uses the resin which has a grain size of 0.3 to 3.0 $\mu$m and the degree of cross-linkage and the pH of which are controlled to suitable values. Accordingly, the emulsion resin has high dispersibility in the mixed solution and is kept stable, and this feature is very advantageous when the treating solution is prepared on the industrial basis or is coated. After baking, an extremely beautiful vitrified glass film having very fine spherical protuberances is uniformly formed on the surface of the film. These very fine protuberances form the reaction products with the phosphates and stably exist on the steel sheet surface even after annealing.

The mechanism in the present invention which improves weldability, insulating property after annealing, lubricating property, adhesion, corrosion resistance, etc., is such that the phosphates of aluminum, zinc, calcium, etc., phosphoric acid, boric acid and borates and the heat-resistant coarse grains together form the compact and uniform insulating film. This heat-resistant film exhibits excellent film characteristics even after annealing because the film formation agent by the inorganic-organic reaction products sufficiently covers the surface of the steel sheet. Particularly, in the present invention, the shape of the uniform, very fine protuberances formed by the uniformly dispersed coarse grain emulsion resin does not change before and after annealing. In this way, the uniform film formation property and heat resistance well match the improvement given by the coarse grain resin, and it is assumed that for this reason, the present invention can provide the improved film formation performance which covers more than sufficiently the drawbacks of the film properties obtained by the powdery resin according to the prior art.

Next, Examples of the present invention will be explained with reference to the accompanying drawings.

EXAMPLE

Example 1

A treating agent primarily comprising an emulsion resin having a composition shown in Table 1 and adjusted to a grain size of 0.7 µm, and a phosphate, was coated onto a 0.5 mm-thick non-oriented electrical steel sheet coil heat-treated by a known method, by using a rubber roll, and baking was then carried out at a sheet temperature of 350° C. The coating quantity in this case was 1.5 g/m² in terms of the weight after baking. A sample was cut out from this coil, and punchability, weldability and film lubricating property, corrosion resistance and insulating property after stress relief annealing at 750° C. for 2 hours, were examined. The results were tabulated in Table 2.

As a result, it was found that the sample of the present invention had excellent film properties before annealing such as punchability and weldability, and film properties after annealing such as lubricating property, corrosion resistance, insulating property, etc., were also at least equal to those of a sample of the Comparative Example using a chromate type film formation agent.

TABLE 1

| Treating solution No. | Phosphate (weight part) | | | Emulsion resin (weight part) | |
|---|---|---|---|---|---|
| | Al | Ca | Zn | Grain size of resin: 0.7 µm | |
| Example 1 | 100 | — | — | Styrene(100%) | 5 |
| Example 2 | 100 | — | — | Styrene(100%) | 15 |
| Example 3 | 100 | — | — | Styrene(100%) | 30 |
| Example 4 | 100 | — | — | Epoxy(100%) | 15 |
| Example 5 | 100 | — | — | Styrene(50%)-Acrylic(50%) | 15 |
| Example 6 | 100 | — | — | Phenol(100%) | 15 |
| Example 7 | 100 | — | — | Melamine(50%)-Phenol(50%) | 15 |
| Example 8 | 100 | — | — | Melamine(50%)-Phenol(50%) | 15 |
| Comparative Example 1 | Magnesium chromate 100 parts by weight | | | Acrylic(80%)-Vinyl acetate(15%)-Styrene(5%) | 15 |

TABLE 2

| Treating solution No. | Punchability (50µ burr) | Condition after welding *1 | Surface roughness after stress relief annealing (µm) | Lubricity after annealing *2 | Corrosion resistance after annealing *3 | Resistivity after annealing (Ω-cm/sheet) | Surface roughness before stress relief annealing (µm) |
|---|---|---|---|---|---|---|---|
| Example 1 | 200 × 10⁴ times < | ○ A few blowhole | 0.29 | ⊚ Good, no flaw | ⊚ | 0.7 | 0.30 |
| Example 2 | 200 × 10⁴ times < | ⊚ Good, no blowhole | 0.34 | ⊚ Good, no flaw | ⊚ | 2.2 | 0.36 |
| Example 3 | 200 × 10⁴ times < | ⊚ Good, no blowhole | 0.32 | ⊚ Good, no flaw | ⊚ | 3.0 | 0.34 |
| Example 4 | 200 × 10⁴ times < | ⊚ Good, no blowhole | 0.34 | ⊚ Good, no flaw | ⊚ | 2.5 | 0.35 |
| Example 5 | 200 × 10⁴ times < | ⊚ Good, no blowhole | 0.32 | ⊚ Good, no flaw | ⊚ | 2.7 | 0.33 |
| Example 6 | 200 × 10⁴ times < | ⊚ Good, no blowhole | 0.35 | ⊚ Good, no flaw | ⊚ | 1.8 | 0.36 |
| Example 7 | 200 × 10⁴ times < | ⊚ Good, no blowhole | 0.31 | ⊚ Good, no flaw | ⊚ | 2.8 | 0.32 |
| Example 8 | 200 × 10⁴ times < | ⊚ Good, no blowhole | 0.33 | ⊚ Good, no flaw | ⊚ | 1.9 | 0.35 |
| Comparative Example 1 | 200 × 10⁴ times < | Δ Slightly many blowholes | 0.12 | Δ Many flaws | Δ | 0.2 | 0.14 |

*1 Weldability; Results of TIG Welding (120A, electrode; Th-W (2.4 mm diameter). Ar flow rate; 6 l/min; Bundling force; 50 kg/cm², Welding rate; 100 cm/min
*2 Film lubricity; As shown in shown in FIG. 1, the resistance force of the steel ball of 10 mm diameter received from the sheet surface while reciprocally moving on the surface at constant load and speed was measured.
*3 Corrosion resistance; The surface condition was observed after 24 hr while the samples was suspended in thermostat at 50° C. and 98% humidity.

Example 2

Each of the film forming agents prepared by blending an emulsion resin the grain size of which was changed as shown in Table 3, the phosphate and boric acid and/or colloidal silica was coated to a coil of 0.5 mm-thick non-oriented electrical steel sheets in the same way as in Example 1, and baking was carried out at a sheet temperature of 300° C. to obtain a respective product.

A sample was cut out from each of the steel sheets, and film properties were examined. The results are shown in Table 4.

TABLE 3

| Treating solution No. | Phosphate (weight part) | Additive (weight part) | | | | (Grain size) | |
|---|---|---|---|---|---|---|---|
| | Al Ca Zn | Colloidal silica | Boric acid | Emulsion resin (Weight part) | | | |
| Example 9 | 80    20 | | | Phenol(80)-Acrylic(20) | 0.7 μm 25 | | |
| Example 10 | 80 20 | | | Phenol(80)-Silicone(20) | 0.7 μm 25 | | |
| Example 11 | 80 10 10 | | | Phenol(80)-Silicone(20) | 0.7 μm 25 | | |
| Example 12 | 80 20 | 20 | | Epoxy(80)-Phenol(20) | 0.3 μm 25 | | |
| Example 13 | 80 20 | | 10 | Epoxy(80)-Phenol(20) | 0.7 μm 25 | | |
| Example 14 | 80 20 | 20 | 10 | Epoxy(80)-Phenol(20) | 2.5 μm 25 | | |
| Example 15 | 80 20 | 20 | 10 | Melamine(100) | 0.7 μm 25 | | |
| Comparative Example 2 | Magnesium chromate 100 weight part | | 10 | Acrylic(70)-Vinyl acetate(25)-Styrene(5) | 0.2 μm 25 | | |

TABLE 4

| Treating solution No. | Surface roughness before stress relief annealing (μm) | Weldability | Surface roughness after stress relief annealing (μm) | Sticking (separating force) in stress relief annealing *4 (g/9 m²) | Lubricity after stress relief annealing |
|---|---|---|---|---|---|
| Example 9 | 0.35 | ⊚ Good, no blowhole | 0.34 | 130 | ⊚ |
| Example 10 | 0.38 | ⊚ Good, no blowhole | 0.38 | 80 | ⊚ |
| Example 11 | 0.42 | ⊚ Good, no blowhole | 0.40 | 80 | ⊚ |
| Example 12 | 0.23 | ○ Good, a few blowhole | 0.20 | 120 | ○ |
| Example 13 | 0.28 | ⊚ Good, no blowhole | 0.25 | 60 | ⊚ |
| Example 14 | 0.65 | ⊚ Good, no blowhole | 0.55 | 50 | ⊚ |
| Example 15 | 0.27 | ⊚ Good, no blowhole | 0.27 | 120 | ⊚ |
| Comparative Example 2 | 0.14 | Δ slightly many blowholes | 0.12 | 150 | x |

Figure 2A:
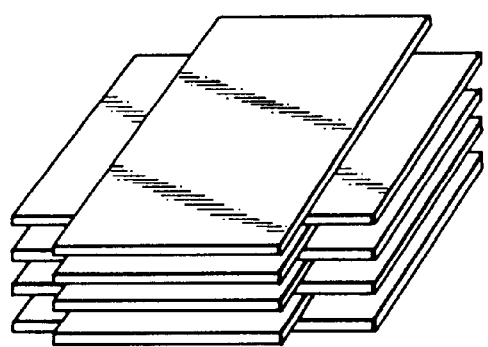
Figure 2B:
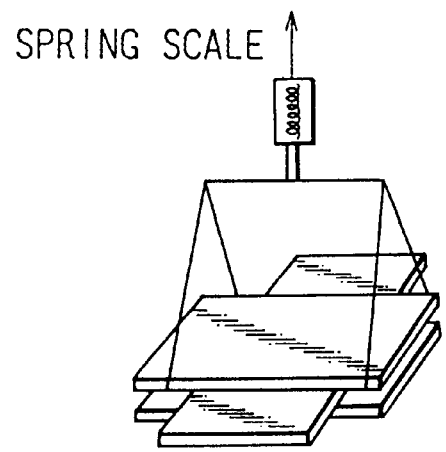

*4 Sticking property resistance after stress relief annealing; As shown in FIG. 2(a), the sheets are stacked and bundled in 40 kg/cm² of bundling force, and thereafter the separating force was measured by a spring scale as shown in FIG. 2(b) after annealing in $N_2$ at 750° C. for 2 hr.

Example 3

Each of the treating solutions prepared by blending aluminum phosphates having a molar ratio of 0.16 shown in Table 5 and an emulsion resin having a grain size of 1.0 μm, a degree of cross-linkage of 4 mol % and a pH of 8.0 was coated to steel sheets of a 0.5 mm-thick non-oriented electrical steel sheet coil treated and annealed by a known method, by using a rubber roll type coater, and baking was carried out at a sheet temperature of 300° C. The coating quantity in this case was 1.5 g/m² in terms of weight after dry coating. Samples were cut out from this coil and from the product obtained by subjecting each coil to stress relief annealing at 750° C. for 2 hours, and film characteristics were examined.

The results of the film characteristics of Examples of the present invention and Comparative Examples are shown in Tables 6 and 7. In Comparative Examples, the space factor and film characteristics after annealing were inferior, and the problems occurred in lubricity, corrosion resistance, rust generation, and so forth. In contrast, the products of the present invention all had a high space factor and excellent punchability and adhesion before annealing, and had also excellent lubricity, corrosion resistance and insulating property after annealing.

TABLE 5

| Treating solution No. | Phosphate | | Emulsion resin | |
|---|---|---|---|---|
| Example 16 | Aluminum phosphate (mole ratio 0.16) | 100 weight part Styrene(100) | Grain-size 1.0 μm | 10 weight part |
| Example 17 | Aluminum phosphate (mole ratio 0.16) | " " | " | 30 weight part |
| Example 18 | Aluminum phosphate (mole ratio 0.16) | " " | " | 50 weight part |

TABLE 5-continued

| Treating solution No. | Phosphate | | Emulsion resin | | |
|---|---|---|---|---|---|
| Example 19 | Aluminum phosphate (mole ratio 0.16) | " | Styrene(50)-Acrylic(50) | " | 30 weight part |
| Example 20 | Aluminum phosphate (mole ratio 0.16) | " | Styrene(50)-Epoxy(50) | " | 30 weight part |
| Comparative Example 3 | Examined J.P. Pub. No. 50–15013 Magnesium chromate 100 weigh part + Boric acid 20 weight part + Acrylic(50)-Styrene(36)-Vinyl acetate(20) 0.1 μm 30 weight part | | | | |
| Comparative Example 4 | Unexamined J.P. Pub. No. 5–78855 Aluminum dihydrogen-phosphate 300 g/l + Acrylic resin (pH 1.9) 20 g + PMMA powder (grain size 15 μm) 5 g | | | | |

TABLE 6

| Treating solution No. | Surface roughness Ra (μm) | Space factor (%) | Adhesion *5 | Inter-layer resistivity (Ω-cm²/sheet) | Punchability (× 10⁴ times) *6 |
|---|---|---|---|---|---|
| Example 16 | 0.25 | 99.4 | ⊚ no peel | 85 | 200 < |
| Example 17 | 0.28 | 99.5 | ⊚ no peel | 100 | " |
| Example 18 | 0.32 | 99.4 | ⊚ no peel | 105 | " |
| Example 19 | 0.30 | 99.4 | ⊚ no peel | 95 | " |
| Example 20 | 0.32 | 99.5 | ⊚ no peel | 100 | " |
| Comparative Example 3 | 0.22 | 99.5 | ⊚ no peel | 75 | " |
| Comparative Example 4 | 0.50 | 98.8 | o Occurrence of a little flaking of powder | 100 | " |

*5 Peel resistance by cellophane adhesive tape ⊚ no adhesion, o a little adhesion, Δ much adhesion, x peel
*6 Steel-dies (SKD-1), clearance 5% punching times up to 50 μm of burr height.

TABLE 7

| Treating solution No. | Surface roughness Ra (μm) | Sticking in annealing *4 | Lubricity *2 | Inter-layer resistivity (Ω-cm²/sheet) | Corrosion resistance *3 | Adhesion *5 |
|---|---|---|---|---|---|---|
| Example 16 | 0.25 | ⊚ No seizure | ⊚ Excellent | 2.8 | ⊚ No occurrence of rust | ⊚ Excellent |
| Example 17 | 0.27 | ⊚ No seizure | ⊚ Excellent | 3.0 | ⊚ No occurrence of rust | ⊚ Excellent |
| Example 18 | 0.30 | ⊚ No seizure | ⊚ Excellent | 3.5 | ⊚ No occurrence of rust | ⊚ Excellent |
| Example 19 | 0.28 | ⊚ No seizure | ⊚ Excellent | 2.9 | ⊚ No occurrence of rust | ⊚ Excellent |
| Example 20 | 0.31 | ⊚ No seizure | ⊚ Excellent | 3.5 | ⊚ No occurrence of rust | ⊚ Excellent |
| Comparative Example 3 | 0.20 | ⊚ No seizure | x No good, occurrence of flaw | 0.3 | x Occurrence of much rust | ⊚ Excellent |
| Comparative Example 4 | 0.45 | ⊚ No seizure | o A few occurrence of flaw | 1.8 | o Occurrence of some rust | X Falling of black powder |

*7 Evaluation of leaving as it is for 90 hr. in 30° C. and 80% of atomosphic humidity.

Example 4

Each of the mixed solutions prepared by blending phosphates, boric acid and emulsion resins having a changed grain size, a degree of cross-linkage of 6 mol % and a pH of 5.0 as shown in Table 8, was coated to a 0.5 mm-thick steel sheet in the same way as in Example 3, and baking was then carried out at a sheet temperature of 250° C. The coating quantity in this case was 1.2 g/m² in terms of the weight after baking. Samples were cut out from each coil and the product obtained by annealing this coil at 750° C. for 2 hours for stress relief, and their film characteristics were examined. The result of Comparative Examples (wherein magnesium chromate and boric acid were used as the inorganic component) was also shown in Tables 9 and 10. This Example provided an electrical insulating film having high space factor, excellent weldability, lubricity, corrosion resistance, etc., film characteristics before and after annealing, in the same way as in Example 3.

TABLE 8

| Treating solution No. | Phosphate (weight part) | | | Additive (weight part) | | Emulsion resin (weight part) | | |
| --- | --- | --- | --- | --- | --- | --- | --- | --- |
| | Aluminum phos. mole ratio 0.16 | Zinc phos. mole ratio 0.45 | Calcium phos. mole ratio 0.45 | $H_3PO_4$ | $H_3BO_3$ | | Grain size | |
| Example 21 | 100 | — | — | 10 | — | Styrene(50)-Metylmetaaclyrate(50) | 0.3 μm | 20 |
| Example 22 | " | — | — | " | — | Styrene(50)-Metylmetaaclyrate(50) | 0.6 μm | " |
| Example 23 | " | — | — | " | — | Styrene(50)-Metylmetaaclyrate(50) | 1.0 μm | " |
| Example 24 | " | — | — | " | — | Styrene(50)-Metylmetaaclyrate(50) | 2.0 μm | " |
| Example 25 | 80 | 10 | 10 | — | 20 | Styrene(70)-Epoxy(30) | 1.0 μm | 20 |
| Example 26 | " | " | " | — | " | | " | 50 |
| Example 27 | " | " | " | — | " | | " | 100 |
| Example 28 | " | " | " | — | " | | " | 200 |
| Comparative Example 5 | Examined J.P. Pub. No.50-15013 Magnesium chromate 100 weight part + Boric acid 20 weight part + Acrylic(50)-Styrene(30)-Vinyl acetate(20) 0.1 μm 30 weight part | | | | | | | |

TABLE 9

| Treating solution No. | Surface roughness Ra (μm) | Space factor (%) | Adhesion *5 | Inter-layer resistivity (Ω-cm²/sheet) | Punchability (× 10⁴ times) *6 | Condition of welding test *1 |
| --- | --- | --- | --- | --- | --- | --- |
| Example 21 | 0.23 | 99.5 | ⊚ Excellent | 95 | 200 < | ○ A few blowhole |
| Example 22 | 0.27 | 99.4 | ⊚ Excellent | 100 | " | ⊚ Good, no blowhole |
| Example 23 | 0.28 | 99.4 | ⊚ Excellent | 100 | " | ⊚ Good, no blowhole |
| Example 24 | 0.32 | 99.3 | ⊚ Excellent | 110 | " | ⊚ Good, no blowhole |
| Example 25 | 0.27 | 99.4 | ⊚ Excellent | 100 | " | ⊚ Good, no blowhole |
| Example 26 | 0.29 | 99.4 | ⊚ Excellent | 105 | " | ⊚ Good, no blowhole |
| Example 27 | 0.30 | 99.3 | ⊚ Excellent | 110 | " | ⊚ Good, no blowhole |
| Example 28 | 0.29 | 99.4 | ⊚ Excellent | 110 | " | ⊚ Good, no blowhole |
| Comparative Example 5 | 0.19 | 99.5 | ⊚ Excellent | 75 | " | Δ No good, slightly many blowholes |

TABLE 10

| Treating solution No. | Surface roughness Ra (μm) | Sticking in annealing *4 | Lubricity *2 | Inter-layer resistivity (Ω-cm²/sheet) | Corrosion resistance after annealing *3 |
| --- | --- | --- | --- | --- | --- |
| Example 21 | 0.23 | ⊚ No seizure | ○ Good | 2.1 | ⊚ Excellent no occurrence of rust |
| Example 22 | 0.26 | ⊚ No seizure | ⊚ Excellent | 2.9 | ⊚ Excellent no occurrence of rust |
| Example 23 | 0.28 | ⊚ No seizure | ⊚ Excellent | 3.7 | ⊚ Excellent no occurrence of rust |
| Example 24 | 0.30 | ⊚ No seizure | ⊚ Excellent | 4.8 | ⊚ Excellent no occurrence of rust |
| Example 25 | 0.26 | ⊚ No seizure | ⊚ Excellent | 4.3 | ⊚ Excellent no occurrence of rust |
| Example 26 | 0.28 | ⊚ No seizure | ⊚ Excellent | 4.0 | ⊚ Excellent no occurrence of rust |

TABLE 10-continued

| Treating solution No. | Surface roughness Ra (μm) | Sticking in annealing *4 | Lubricity *2 | Inter-layer resistivity (Ω-cm²/sheet) | Corrosion resistance after annealing *3 |
|---|---|---|---|---|---|
| Example 27 | 0.30 | ⊚ No seizure | ⊚ Excellent | 3.3 | ⊚ Excellent no occurrence of rust |
| Example 28 | 0.29 | ⊚ No seizure | ⊚ Excellent | 2.9 | ⊚ Excellent no occurrence of rust |
| Comparative Example 5 | 0.18 | ⊚ No seizure | x No good, many flaws | 0.2 | x Occurrence of much rust |

Example 5

Each of the treating solutions prepared by blending solutions each having a different molar ratio of the phosphate and styrene-acryl type emulsion resins each having a grain size of 1.0 μm, a different degree of cross-linkage and a pH of 8.5 as shown in Table 11, was coated to a 0.5 mm-thick steel sheet after finish annealing, in the same way as in Example 3, and baking was then carried out at a sheet temperature of 450° C. The coating quantity in this case was 2.0 g/m² in terms of the weight after drying. Samples were cut out from each coil and the product after annealing the coil at 750° C. for 2 hours for stress relief, and the film characteristics were examined. The film characteristics before and after annealing are shown in Tables 12 and 13.

The films of the present invention, wherein the molar ratio of the phosphates was within the range of the present invention, had remarkably improved film appearance and film characteristics in the same way as in Example 3. When the degree of cross-linkage was within the range of the present invention, extremely excellent film appearance and film characteristics before and after annealing could be obtained.

TABLE 11

| Treating solution No. | Aluminum phosphate (weight part) Mole ratio | | Boric acid (weight part) | Emulsion resin; grain size 1 μm (weight part) | | |
|---|---|---|---|---|---|---|
| Example 29 | mole ratio | 0.20 | 100 | 5 | Styrene(80)-Metylmetaaclyrate(20) | Degree of cross linkage: 4 mole % | 20 |
| Example 30 | | 0.17 | " | " | Styrene(80)-Metylmetaaclyrate(20) | Degree of cross linkage: 4 mole % | " |
| Example 31 | | 0.15 | " | " | Styrene(80)-Metylmetaaclyrate(20) | Degree of cross linkage: 4 mole % | " |
| Comparative Example 6 | | 0.22 | " | " | Styrene(80)-Metylmetaaclyrate(20) | Degree of cross linkage: 4 mole % | " |
| Comparative Example 7 | | 0.10 | " | " | Styrene(80)-Metylmetaaclyrate(20) | Degree of cross linkage: 4 mole % | " |
| Example 32 | | 0.16 | " | " | Styrene(50)-Epoxy(25)-Acrylic(25) | Degree of cross linkage: 2 mole % | " |
| Example 33 | | 0.16 | " | " | Styrene(50)-Epoxy(25)-Acrylic(25) | Degree of cross linkage: 4 mole % | " |
| Example 34 | | 0.16 | " | " | Styrene(50)-Epoxy(25)-Acrylic(25) | Degree of cross linkage: 7 mole % | " |
| Comparative Example 8 | Examined J.P. Pub. No. 50-15013 Magnesium chromate 100 weight part + Boric acid 20 weight part + acrylic(50)-styrene(30)-Vinyl acetate (20) 0.1 μm 30 weight part | | | | | | |

TABLE 12

| Treating solution No. | Film appearance (transparency gloss) | Surface roughness Ra (μm) | Space factor (%) | Adhesion *5 | Punchability (× 10⁴ times) *6 | Corrosion resistance *7 |
|---|---|---|---|---|---|---|
| Example 29 | ⊚ Colorless, clear gloss | 0.28 | 99.4 | ⊚ Excellent | 200 < | ⊚ Excellent |
| Example 30 | ⊚ Colorless, clear gloss | 0.27 | 99.4 | ⊚ Excellent | " | ⊚ Excellent |
| Example 31 | ⊚ Colorless, clear gloss | 0.27 | 99.5 | ⊚ Excellent | " | ⊚ Excellent |
| Comparative Example 6 | Δ Slightly opaque | 0.29 | 99.2 | ⊚ Excellent | " | ⊚ Excellent |

TABLE 12-continued

| Treating solution No. | Film appearance (transparency gloss) | Surface roughness Ra (μm) | Space factor (%) | Adhesion *5 | Punchability (× 10⁴ times) *6 | Corrosion resistance *7 |
|---|---|---|---|---|---|---|
| Comparative | ⊚ Colorless, clear gloss | 0.25 | 99.5 | ⊚ Excellent | " | Δ Occurrence of a few rust |
| Example 32 | ⊚ Colorless, clear gloss | 0.27 | 99.4 | ⊚ Excellent | " | ⊚ Excellent |
| Example 33 | ⊚ Colorless, clear gloss | 0.27 | 99.3 | ⊚ Excellent | " | ⊚ Excellent |
| Example 34 | ⊚ Colorless, clear gloss | 0.26 | 99.4 | ⊚ Excellent | " | ⊚ Excellent |
| Comparative Example 8 | ⊚ Green brown gloss | 0.20 | 99.4 | ⊚ Excellent | " | x Slightly much rust |

TABLE 13

| Treating solution No. | Surface roughness Ra (μm) | Sticking in annealing *4 | Lubricity *2 | Inter-layer resistivity (Ω-cm²/sheet) | Adhesion *5 | Corrosion resistance *7 |
|---|---|---|---|---|---|---|
| Example 29 | 0.28 | ⊚ No seizure | ⊚ Excellent | 3.8 | ⊚ Excellent | ⊚ Excellent |
| Example 30 | 0.26 | ⊚ No seizure | ⊚ Excellent | 3.7 | ⊚ Excellent | ⊚ Excellent |
| Example 31 | 0.27 | ⊚ No seizure | ⊚ Excellent | 3.7 | ⊚ Excellent | ⊚ Excellent |
| Comparative Example 6 | 0.28 | ⊚ No seizure | o A few flaws | 3.5 | o A little flaking | ⊚ Excellent |
| Comparative Example 7 | 0.29 | Δ A little seizure | o A few flaws | 2.0 | Δ A little flaking | o A little rust |
| Example 32 | 0.26 | ⊚ No seizure | ⊚ Excellent | 4.1 | ⊚ Excellent | ⊚ Excellent |
| Example 33 | 0.26 | ⊚ No seizure | ⊚ Excellent | 3.7 | ⊚ Excellent | ⊚ Excellent |
| Example 34 | 0.25 | ⊚ No seizure | ⊚ Excellent | 3.8 | ⊚ Excellent | ⊚ Excellent |
| Comparative Example 8 | 0.18 | ⊚ No seizure | x Many flaws | 0.2 | ⊚ Excellent | x Occurrence of much rust |

Figure 3A:
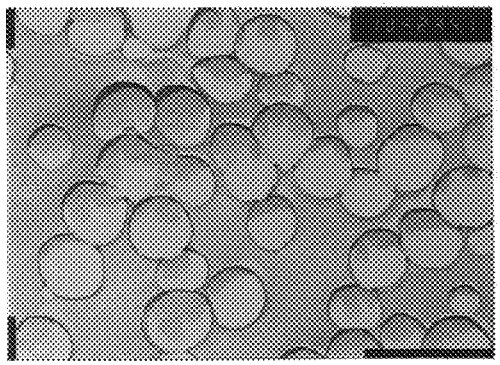
Figure 3B:
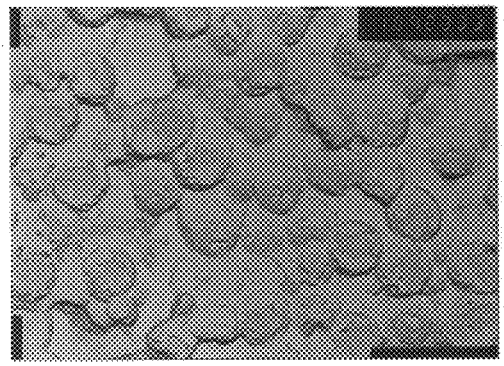

Incidentally, FIG. 3 shows surface photographs of the film obtained by the treating solution No. 29 in Example 5 of the present invention. As can be understood from the photographs, hardly any change can be observed in the surface shapes before and after annealing, or, in other words, the film remains extremely stable.

We claim:

1. A treating solution consisting essentially of 100 parts by weight, calculated in terms of a solid, of at least one member selected from the group consisting of aluminum phosphate, calcium phosphate and zinc phosphate as an inorganic material, and, as an organic material, 1 to 300 parts by weight of a water-dispersible grain emulsion resin dispersed in water, said emulsion resin having a grain size of 0.3 to 3.0 μm;

wherein, when said phosphate used as said inorganic component is aluminum phosphate, the molar ratio of $Al_2O_3/H_3PO_4$ is from 0.15 to 0.20, and when said phosphate is calcium phosphate or zinc phosphate, the molar ratio $CaO/H_3PO_4$ or $ZnO/H_3PO_4$ is from 0.40 to 0.60;

wherein the pH of said coarse grain emulsion used as said organic component is from 4 to 10; and wherein a degree of cross-linkage of said coarse grain resin emulsion used as said organic component is from 0.4 to 8 mol % with respect to a cross-linkable monomer.

2. A treating solution according to claim 1 wherein said resin is acrylic resin.

3. A treating solution consisting essentially of 100 parts by weight, calculated in terms of a solid, of at least one member selected from the group consisting of aluminum phosphate, calcium phosphate and zinc phosphate and containing at least 50% of aluminum phosphate, as an inorganic material, and 1 to 20 parts by weight of at least one member selected from the group consisting of phosphoric acid, boric acid, borates and colloidal silica, and, as an organic component, 1 to 300 parts by weight of a water-dispersible grain emulsion resin dispersed in water, said emulsion resin having a grain size of 0.3 to 3.0 μm;

wherein, for said aluminum phosphate, the molar ratio of $Al_2O_3/H_3PO_4$ is from 0.15 to 0.20, and when said phosphate is calcium phosphate or zinc phosphate, the molar ratio $CaO/H_3PO_4$ or $ZnO/H_3PO_4$ is from 0.40 to 0.60;

wherein the pH of said coarse grain emulsion used as said organic component is from 4 to 10; and wherein a degree of cross-linkage of said coarse grain resin emulsion used as said organic component is from 0.4 to 8 mol % with respect to a cross-linkable monomer.

4. A treating solution according to claim 3 wherein said resin is acrylic resin.

5. A method for producing a non-oriented electrical steel sheet comprising a treating solution consisting essentially of, as an organic component, 1 to 300 parts by weight of a water dispersible grain emulsion resin dispersed in water, said emulsion resin having a grain size of 0.3 to 3.0 μm, and 100 parts by weight, calculated in terms of a solid, of at least one member selected from the group consisting of aluminum phosphate, calcium phosphate and zinc phosphate as an inorganic component is uniformly coated on a surface of a non-oriented electrical steel sheet, and is then baked at 200 to 500° C.;

wherein, when said phosphate used as said inorganic component is aluminum phosphate, the molar ratio of $Al_2O_3/H_3PO_4$ is from 0.15 to 0.20, and when said phosphate is calcium phosphate or zinc phosphate, the molar ratio $CaO/H_3PO_4$ or $ZnO/H_3PO_4$ is from 0.40 to 0.60;

wherein the pH of said coarse grain emulsion used as said organic component is from 4 to 10; and wherein a degree of cross-linkage of said coarse grain resin emulsion used as said organic component is from 0.4 to 8 mol % with respect to a cross-linkable monomer.

6. A method according to claim 5 wherein said resin is acrylic resin.

7. A method of producing a non-oriented electrical steel sheet comprising a treating solution consisting essentially of, as an organic component, 1 to 300 parts by weight of a water-dispersible grain emulsion resin dispersed in water, said emulsion resin having a grain size of 0.3 to 3.0 μm, and 100 parts by weight, calculated in terms of a solid, of at least one member selected from the group consisting of aluminum phosphate, calcium phosphate and zinc phosphate, and 1 to 20 parts by weight of at least one member selected from the group consisting of phosphoric acid, boric acid, borates and colloidal silica, as an inorganic component, is uniformly coated on a surface of a non-oriented electrical steel sheet, and is then baked at 200 to 500° C.;

wherein, when said phosphate used as said inorganic component is aluminum phosphate, the molar ratio of $Al_2O_3/H_3PO_4$ is from 0.15 to 0.20, and when said phosphate is calcium phosphate or zinc phosphate, the molar ratio $CaO/H_3PO_4$ or $ZnO/H_3PO_4$ is from 0.40 to 0.60;

wherein the pH of said coarse grain emulsion used as said organic component is from 4 to 10; and wherein a degree of cross-linkage of said coarse grain resin emulsion used as said organic component is from 0.4 to 8 mol % with respect to a cross-linkable monomer.

8. A method according to claim 7 wherein said grain emulsion comprises a resin and said resin is acrylic resin.

* * * * *